US006470706B1

(12) United States Patent
Engdahl

(10) Patent No.: US 6,470,706 B1
(45) Date of Patent: Oct. 29, 2002

(54) SYSTEM AND APPARATUS FOR CONDENSING BOIL-OFF VAPOR FROM A LIQUIFIED NATURAL GAS CONTAINER

(75) Inventor: Gerald E. Engdahl, Wheaton, IL (US)

(73) Assignee: Chicago Bridge & Iron Company, Plainsfield, IL (US)

( * ) Notice: Subject to any disclaimer, the term of this patent is extended or adjusted under 35 U.S.C. 154(b) by 65 days.

(21) Appl. No.: 09/603,160

(22) Filed: Jun. 23, 2000

Related U.S. Application Data
(60) Provisional application No. 60/140,577, filed on Jun. 23, 1999.

(51) Int. Cl.[7] ................................. F25J 1/00
(52) U.S. Cl. ......................................... 62/614
(58) Field of Search ................. 62/47.1, 48.2, 62/614

(56) References Cited

U.S. PATENT DOCUMENTS

| 2,938,360 | A |   | 5/1960 | Christensen |
|---|---|---|---|---|
| 3,894,856 | A | * | 7/1975 | Lofredo et al. ............... 55/62 |
| 4,551,981 | A |   | 11/1985 | Banerjee |
| 6,032,483 | A |   | 3/2000 | Paganessi et al. |

FOREIGN PATENT DOCUMENTS

WO   WO 98/42434   10/1998

OTHER PUBLICATIONS

International Search Report, PCT Application No. PCT/US00/17354, filed Jun. 23, 2000.

* cited by examiner

Primary Examiner—William C. Doerrler
Assistant Examiner—Malik N. Drake
(74) Attorney, Agent, or Firm—Marshall, Gerstein & Borun

(57) ABSTRACT

A system and apparatus for condensing boil-off vapor from a Liquified Natural Gas (LNG) container are disclosed. A system for condensing vapor includes the steps of providing contact area within a condenser vessel, directing vapor to the condenser vessel, providing a condensing fluid and a pump fluid, directing the condensing fluid to the condenser vessel, varying the flow of the condensing fluid to control the pressure in the vessel, contacting the vapor with the condensing fluid to create a condensate, and combining the condensate and the pump fluid. An apparatus for condensing vapor includes a vessel, a liquified gas input to the vessel, control means on the liquified gas input for varying a first liquified gas stream to control the pressure in the vessel, a vapor input to the vessel, means for condensing vapor in the vessel, and means for combining condensed vapor with a second liquified gas stream.

23 Claims, 2 Drawing Sheets

SYSTEM AND APPARATUS FOR CONDENSING BOIL-OFF VAPOR FROM A LIQUIFIED NATURAL GAS CONTAINER

RELATED APPLICATIONS

This application claims domestic priority from provisional application Serial No. 60/140,577, filed Jun. 23, 1999, the entire disclosure of which is incorporated herein by reference.

FIELD OF THE INVENTION

The present invention relates generally to storage and distribution systems for Liquified Natural Gas (LNG). More specifically, the present invention relates to an apparatus and method for condensing boil-off vapor received from an LNG storage tank and condensing the vapor into an output stream for routing into a distribution system.

BACKGROUND OF THE INVENTION

Imported Liquified Natural Gas (LNG) is stored at many locations throughout the world. The LNG is used when a local source of natural gas is not available or as a supplement to local sources.

Liquified Natural Gas (LNG) is typically stored at low pressure and in liquid form at cold temperatures at an import terminal. The LNG is usually pumped to a pressure that is slightly above the pressure of the natural gas distribution pipeline. The high pressure liquid is vaporized and sent to the distribution pipeline. The pumping operation typically involves a set of low pressure pumps located in a storage container connected in series to a set of high pressure pumps located outside the storage tank.

As is well known, heat input into the storage container generates boil-off vapor. Additional vapor generation may occur during filling of the storage container. Vapor may be obtained from an outside source such as a ship. Ideally, the boil-off vapor is included with the sendout to the distribution pipeline.

Compressors may be used to boost the vapor to the high operating pressure of the pipeline, which can be as high as 100 bar. Compressing the vapor to these high pressures requires considerable energy. A more energy efficient method for disposition of the vapor to the pipeline is desired.

A more energy efficient system utilizes the cold LNG sendout to condense vapor at a low interstage pressure. The vapor condensate combines with the liquid sendout flow and enters the high pressure pumps. The stream flows to the vaporizers from the high pressure pumps. Compressing the boil off vapor stream to the distribution pipeline pressures requires considerably more energy than boosting the boil off vapor condensate to the high pressure with a liquid pump. Several existing LNG import terminals have systems which condense boil off vapor at low pressure and pump the condensate with the liquid stream flowing to the vaporizer. However, the boil off vapor condensers at these prior art terminals lack the physical arrangement and control systems to obtain proper operation and high efficiency.

SUMMARY OF THE INVENTION

In accordance with one aspect of the invention, a system for condensing vapor includes the steps of providing contact area within a condenser vessel, directing vapor to the condenser vessel, providing a condensing fluid and a pump fluid, directing the condensing fluid to the condenser vessel, varying the flow of the condensing fluid to control the pressure in the vessel, contacting the vapor with the condensing fluid to create a condensate, and combining the condensate and the pump fluid.

In further accordance with a preferred embodiment, the condenser vessel is utilized as a pump suction vessel. The step of forming a surface layer of liquid that is substantially at its saturation temperature may be included. The condensate and the pump fluid may be mixed in the vessel, or the condensate and the pump fluid may be mixed outside the vessel.

The pressure in the vessel may be controlled by removing vapor during high pressure conditions in the vessel. Alternatively, the pressure in the vessel may be controlled by adding vapor during low pressure conditions in the vessel. Further, the pressure in the vessel may be controlled by removing vapor during high pressure conditions in the vessel and by adding vapor during low pressure conditions in the vessel.

In accordance with another aspect of the invention, a system for condensing vapor includes the steps of providing contact area within a condenser vessel, directing vapor to the condenser vessel, providing a condensing fluid and a pump fluid, varying the flow of the pump fluid to control a liquid level in the vessel, directing the condensing fluid to the condenser vessel, varying the flow of the condensing fluid to control the pressure in the vessel, contacting the vapor with the condensing fluid to create a condensate, and combining the condensate and the pump fluid.

In accordance with a further aspect of the invention, a system for condensing vapor includes the steps of condensing vapor in a condenser vessel to create a condensate, mixing the condensate with a pump fluid to create a combined stream, measuring a temperature difference between the condensate and the combined stream, and utilizing the temperature difference to provide control logic for a vapor compressor.

In accordance with yet another aspect of the invention, a vapor condenser includes a vessel, a liquified gas input to the vessel, control means on the liquified gas input for varying a first liquified gas stream to control the pressure in the vessel, a vapor input to the vessel, means for condensing vapor in the vessel, and means for combining condensed vapor with a second liquified gas stream.

In accordance with a still further aspect of the invention, a vapor condenser includes a vessel, a liquified gas input to the vessel, control means on the liquified gas input for varying a first liquified gas stream to control the pressure in the vessel, a vapor input to the vessel, means for condensing vapor in the vessel, a second liquified gas input to the vessel, second control means on the second liquified gas input for varying a second liquified gas stream to control liquid level in the vessel, and means for combining condensed vapor with the second liquified gas stream.

In accordance with another aspect of the invention, a vapor condenser includes a vessel, means for condensing vapor in the vessel, control means for varying the flow of a first stream of liquified gas to control pressure in the vessel, means for combining the condensed vapor with a second stream of liquified gas to create a combined stream, means for measuring a temperature difference between the condensate and the combined stream, and means for using the temperature difference to control a vapor compressor.

Other features and advantages are inherent in the apparatus claimed and disclosed or will become apparent to those skilled in the art from the following detailed description and its accompanying drawings.

DETAILED DESCRIPTION OF THE INVENTION

The embodiments described herein are not intended to be exhaustive or to limit the scope of the invention to the precise forms disclosed. Rather, the following embodiments have been chosen and described in order to best explain the principles of the invention and to enable others skilled in the art to follow the teachings thereof.

Figure 1:
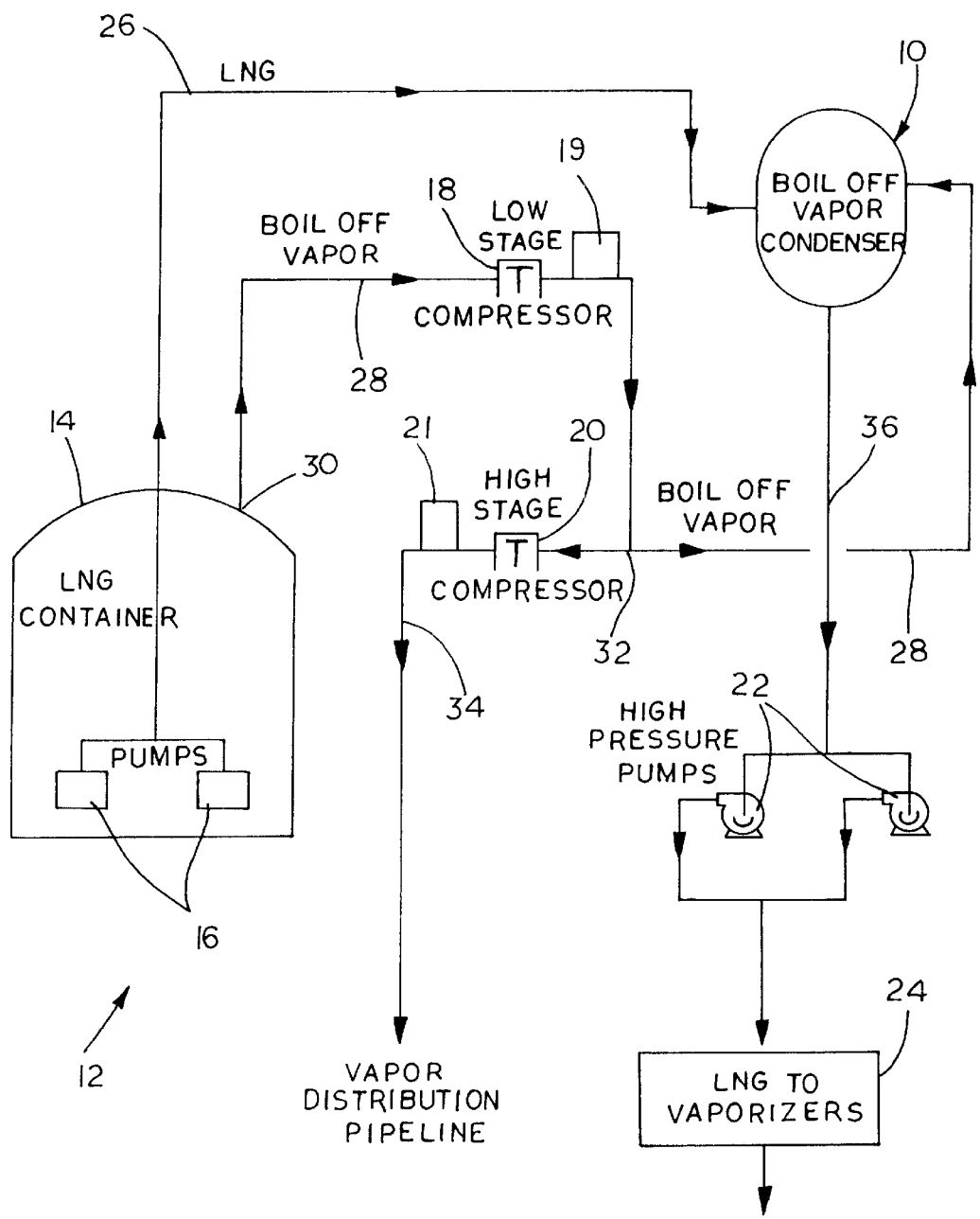
FIG. 1 is a schematic illustration of a Liquified Natural Gas storage container operatively connected to a boil-off vapor condenser assembled in accordance with the teachings of the present invention.

Referring now to the drawings, FIG. 1 illustrates a boil-off vapor condenser constructed in accordance with the teachings of the present invention and which is generally referred to by the reference numeral 10. The Vapor condenser 10 is shown operatively connected to various components of a Liquified Natural Gas (LNG) storage and distribution system 12. The LNG storage and distribution system 12 includes a storage tank 14 having one or more internal or external pumps 16, a low stage compressor 18 having an optional cooler 19, a high stage compressor 20 having an optional cooler 21, one or more high pressure pumps 22, and a vaporizer 24. It will be understood that vapor from the vaporizer is routed to a distribution pipeline (not shown) in a well known manner.

A pipeline 26 connects the pumps 16 to the vapor condenser 10 for routing a stream of LNG to the vapor condenser 10. A pipeline 28 connects a vapor vent 30 in the storage tank to the low stage compressor and then to the vapor condenser 10 as will be discussed in greater detail below. As would be known, the vapor from the storage tank 14 is typically at a low first pressure, and must first be boosted to an interstage second pressure by the low stage compressor 18. Preferably, a "T" 32 is provided in the pipeline 28 which enables a portion or all of the vapor to be diverted from the pipeline 28 into a pipeline 34, thereby bypassing the condenser 10. The diverted portion of the vapor may be boosted to a high pressure by the high stage compressor 20 for routing directly to the distribution pipeline (not shown). An output pipeline 36 connects the Vapor condenser 10 to the high pressure pumps 22 for routing the LNG from the Vapor condenser 10 to the vaporizer 24, from where the LNG is converted to vapor and routed to the distribution pipeline (not shown) in a known manner.

Figure 2:
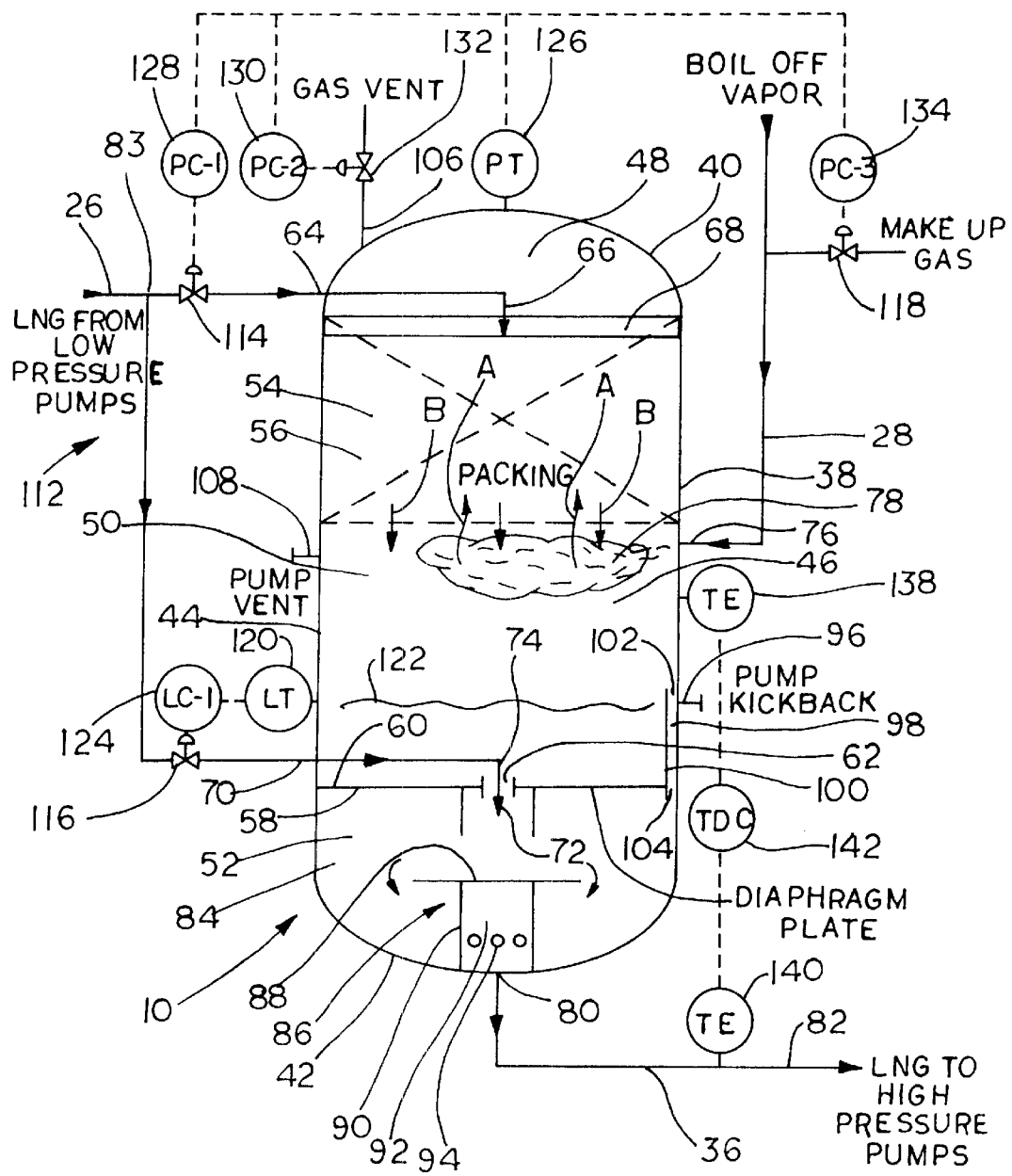
FIG. 2 is a schematic illustration of a boil-off vapor condenser assembled in accordance with the teachings of the present invention.

Referring now to FIG. 2, the Vapor condenser 10 includes a vessel 38 having a generally dome shaped top 40, a generally dome shaped bottom 42, and a sidewall 44, all of which enclose a chamber 46. The chamber 46 includes a top portion 48, a central portion 50, and a bottom portion 52. A plurality of random packing elements 54 are disposed within the chamber 46, with the random packing elements 54 preferably being disposed toward the top portion 48 of the chamber 46. The packing elements 54 together define an enhanced surface area 56. Random packing elements 54 can be 2" Pall rings. The heat and mass transfer area for vapor condensing can be provided by alternate surface area arrangements including structured packing, tray columns or spray elements.

A diaphragm plate 58 is disposed within the vessel 38, and generally separates the bottom portion 52 and the central portion 50 of the chamber 46. The diaphragm plate 58 includes an upper collection surface 60 and a central drain aperture 62. An input 64 is provided which routes a first stream, condensing fluid 66 of cold LNG into the top portion 48 of the chamber 46. Preferably, the input 64 is positioned such that the first stream 66 enters the chamber 46 above the packing elements 54. Still preferably, a liquid distributor 68 is provided which helps to disperse the first stream 66 over the packing elements 54.

Another input 70 is provided which routes a second stream, pump fluid 72 of cold LNG into the bottom portion 52 of the chamber 46. It will be noted that in the embodiment shown the input 70 is positioned immediately above the diaphragm plate 58, with the input 70 including an internal conduit 74 which extends through the drain aperture 62 such that the second stream 72 enters the bottom portion 52 of the chamber 46. Alternatively, the input 70 may be positioned to directly enter the bottom portion 52 of the chamber 46 or would join the condensate stream remote from the vessel. A vapor input 76 is provided which is in flow communication with the pipeline 28 for routing boil-off vapor (indicated as 78) into the chamber 46. Preferably, the boil-off vapor 78 will enter the central portion 50 of the chamber 46. An output 80 is provided in the bottom portion 52. The output 80 is in flow communication with the pipeline 36 for routing an output stream 82 to the high pressure pumps 22 (shown in FIG. 1). Preferably, a "T" 83 is disposed in the pipeline 26 for dividing the stream of LNG flowing through the pipeline 26 into the first stream 66 and the second pump fluid stream 72.

Referring still to FIG. 2, the bottom portion 52 of the chamber 46 includes a mixing chamber 84. The mixing chamber 84 is bounded primarily by the diaphragm plate 58 and the bottom 42 of the vessel 38. Depending on the location of the diaphragm plate 58, a portion of the sidewall 44 may also bound a portion of the mixing chamber 84. Preferably, the mixing chamber 84 will have disposed therein a vortex breaker 86. The vortex breaker 86 preferably includes an upper plate 88 which sits atop a generally cylindrical tube 90 which defines therewithin a subchamber 92. The subchamber 92 generally surrounds the output 80. A plurality of apertures 94 are provided for providing flow communication between the mixing chamber 84 and the subchamber 92 so that fluid within the mixing chamber may drain or otherwise be pumped or drawn through the output 80 via the apertures 94.

An input 96 may be provided which is in flow communication with the high pressure pumps 22 via a pipeline (not shown). The input 96 preferably enters the chamber 46 adjacent to a passage or downcomer 98 between the central portion 50 and the bottom portion 52 of the chamber 46. The downcomer 98 includes an upper end 102 disposed above the diaphragm plate 58 and includes a lower end 104 disposed below the diaphragm plate 58. A splash plate 100 is preferably provided. The vessel 38 will preferably also include pressure vent 106 and a pump vent 108. Vessel 38 is also used as a suction pot for the high pressure pumps. The pump vent 108 is connected to the high pressure pumps to vent vapor from the pumps, generally prior to starting the pumps.

Preferably, a control system is provided for controlling the vapor condenser 10. The control system includes pressure control valve 114, liquid level control valve 116, gas vent control valve 132, and make up gas control valve 118. In the embodiment shown, the valve 114 is disposed downstream of the "T" 83. A liquid level transmitter 120 is disposed to measure the level of liquid (indicated as 122) within the chamber 46, with the desired liquid level preferably being at a level within the central portion 50 as shown in FIG. 2. The liquid level transmitter 120 is operatively connected to a level controller 124, which controls the valve 116. The control valve 116 controls the second stream 70 entering the vessel 38 to maintain the desired liquid level.

The control system also includes a pressure transmitter 126 which measures the pressure within the vessel 38. The pressure transmitter 126 is operatively connected to a pressure controller 128, which controls the control valve 114. The control valve 114 controls the first stream 66 entering the vessel 38. The pressure transmitter 126 is also connected to a second pressure controller 130, which is operatively connected to a valve 132 disposed at the pressure vent 106. The control system preferably also includes a pressure controller 134 for controlling the valve 118 connected to a source of make-up gas (not shown) which may be routed into the vapor pipeline 28.

Preferably, the control system will also include a pair of temperature elements 138, 140, which may be thermocouples or resistance temperature detectors, or any other suitable temperature element. The temperature element 138 is disposed to measure the condensate temperature within the vessel 38, preferably within the central portion 50, while the temperature element 140 is disposed to measure the temperature within the output stream 82. A temperature difference controller 142 is operatively connected to both of the temperature elements 138, 140.

In operation, boil-off vapor is routed to the vapor condenser 10 via the pipeline 28 and enters the central portion 50 of the vessel 38 via the input 76. The LNG stream is conveyed from the storage tank 14 in cold, liquid form through the pipeline 26 to the vapor condenser 10. At the "T" 83, which is disposed in the pipeline 26, the stream of LNG is split into a first stream 66 which enters the vessel 38 via the input 64 and a second stream 72 which enters the vessel 38 via the input 70. The first stream 66 enters the top portion 48 of the chamber 46 at a point above the packing elements 54. The first stream 66 comes into contact with liquid distributor 68, which helps to disperse the first stream 66 over the packing elements 54, such that the first stream 66 spreads out over the enhanced surface area 56 of the packing elements 54.

At the same time, the boil-off vapor 78 enters the chamber 46 via the input 76 from the pipe line 28. Once the vapor 78 has entered the central portion 50 of the chamber 46, it will rise in the direction indicated by the reference arrow "A". The rising vapor 78 contacts the dispersed first stream 66 which is spread out over the enhanced surface area 56 of the packing elements 54. It will also be appreciated that the first stream 66 is very cold, being at cryogenic temperatures, while the boil-off vapor 78 is relatively warm. The boil-off vapor 78 thus comes into direct contact with the dispersed first stream 66, with the cold first stream 66 causing the vapor 78 to condense thus forming a condensate which drains downwardly in the direction indicated by the reference arrow "B". Condensate may be defined as a fluid containing condensing liquid and condensed vapor as major components. The condensate gathers on the upper collection surface 60 of the diaphragm plate 58. The diaphragm plate 58 provides a separation such that the upper vessel can operate at a pressure close to the saturation pressure of the condensate liquid. The pool of condensate liquid 60 helps to maintain a stable operating pressure in the vessel. Baffles or other means can be used as alternatives to plate 58 to help maintain conditions approaching saturation in the upper portion of the vessel. It will be noted in the embodiment shown that the first stream and the condensate flow generally in a direction that is counter to the upward, rising direction of the vapor 78.

As an alternative to the counter-current flow shown, the vessel 38 and the various inputs may be arranged such that the vapor 78 and the first stream 66 and the condensate flow in a parallel (i.e., downward) direction.

The second stream 72 enters the bottom portion 52 of the chamber 46. The condensate liquid above the diaphragm plate 58 drains through the drain aperture 62 into the mixing chamber 84 defined in the bottom portion 52 of the chamber 46. The condensate mixes with the second stream 72. The liquid entering the mixing chamber 84 eventually drains through the apertures 94 into the subchamber 92. The liquid then leaves the vessel 38 as an output stream through the output 80 into the pipeline 36. The apertures 94 serve to enhance the mixing process.

It will appreciated that after the boil-off vapor 78 and the first stream 66 form the condensate, that the condensate will be warmer than the LNG initially entering as the first stream. The condensate is at or near its saturation temperature at the vessel operating pressure. Accordingly, when the condensate is mixed with the colder second stream 72 within the mixing chamber 84, the output stream 82 will be subcooled. The output stream 82 is then routed through the pipeline 36 to the high pressure pumps 22.

The control system will preferably maintain the pressure within the vapor condenser 10 at a predetermined range. In the event an upset causes the pressure within the vessel 38 to rise above the desired pressure range, the pressure controller 130 will open the valve 132, such that vapor is vented through vent 106. An upset condition may occur when sufficient LNG is not available to condense the incoming vapor flow. On the other hand, in the event the pressure within the vessel 38 drops below the desired pressure range, pressure controller 134 will open the valve 118, which allows a quantity of makeup gas to enter the vessel 38 thereby raising the pressure.

Ideally, however, the pressure can be controlled without venting and without using makeup gas. Normally, the vessel pressure would be controlled by throttling the valve 114 using the controller 128. A portion of the low pressure pump flow in line 26 flows through valve 114 and is used to condense the vapor and maintain the vessel pressure at its operating condition. The flow not required for condensing is directed through valve 116 to chamber 84. Further, it will be noted that the central portion 50 of the chamber 46 encloses a relatively large volume, which gives the vessel 38 a liquid level capacitance.

The temperature difference between the condensate temperature provided by the temperature element 138 and the combined stream temperature provided by the temperature element 140 gives an indication of the amount of subcooling of the combined stream 36. The amount of subcooling can be utilized to provide logic for control of system compressors. A highly subcooled stream could indicate that additional vapor from the low stage compressor could be condensed and/or the high stage compressor capacity could be reduced.

The vessel pressure can also provide logic for compressor control. An increase in vessel pressure can initiate an increase in the high stage compressor capacity. The vapor flow entering the condenser vessel will decrease. The LNG flow required for condensing the vapor will be decreased.

A boil off vapor condenser assembled in accordance with the above-described teachings of the invention will meet at least some of the following objectives:

1) Condense the maximum quantity of boil off vapor for the complete range of liquid flows and will reduce power consumption;
2) Provide controlled LNG sub-cooling for effective high pressure pump operation, and will maintain net positive suction head for the high pressure pumps to prevent cavitation and failure;
3) Accommodate the turn-up and turn-down of step changes in the liquid flow rates;
4) Accommodate the turn-up and turn-down of step changes in the vapor flow rates;
5) Maintain constant condenser vessel pressure without repeated vapor venting or vapor make up, will stabilize vessel pressure, reduce vapor loss, increase efficiency, and stabilize pumping system flow; and
6) Provide logic for compressor control and interstage pump flow, and be adjustable for operating energy savings.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. The details of the structure may be varied substantially without departing from the spirit of the invention, and the exclusive use of all modifications which come within the scope of the appended claims is reserved.

What is claimed:

1. A process for condensing vapor, comprising the steps of:
   providing contact area within a condenser vessel;
   directing vapor to the condenser vessel;
   providing a condensing fluid and a pump fluid;
   directing the condensing fluid to the condenser vessel;
   varying the flow of the condensing fluid to control the pressure in the vessel;
   contacting the vapor with the condensing fluid to create a condensate; and
   combining the condensate and the pump fluid.

2. A process for condensing vapor comprising the steps of:
   providing contact area within a condenser vessel;
   directing vapor to the condenser vessel;
   providing a condensing fluid and a pump fluid;
   directing the condensing fluid to the condenser vessel;
   varying the flow of the condensing fluid to control the pressure in the vessel;
   contacting the vapor with the condensing fluid to create a condensate;
   combining the condensate and the pump fluid; and
   wherein the condenser vessel is utilized as a pump suction vessel.

3. A process for condensing vapor comprising the steps of:
   providing contact area within a condenser vessel;
   directing vapor to the condenser vessel;
   providing a condensing fluid and a pump fluid;
   directing the condensing fluid to the condenser vessel;
   varying the flow of the condensing fluid to control the pressure in the vessel;
   contacting the vapor with the condensing fluid to create a condensate;
   combining the condensate and the pump fluid; and
   forming a surface layer of liquid that is substantially at its saturation temperature.

4. A process in accordance with claim 1, wherein the condensate and the pump fluid are mixed in the vessel.

5. A process in accordance with claim 1, wherein the condensate and the pump fluid are mixed outside the vessel.

6. A process in accordance with claim 1, wherein the pressure in the vessel is also controlled by removing vapor during high pressure conditions in the vessel.

7. A process in accordance with claim 1, wherein the pressure in the vessel is also controlled by adding vapor during low pressure conditions in the vessel.

8. A process in accordance with claim 1, wherein the pressure in the vessel is also controlled by removing vapor during high pressure conditions in the vessel and by adding vapor during low pressure conditions in the vessel.

9. A process for condensing vapor, comprising the steps of:
   providing contact area within a condenser vessel;
   directing vapor to the condenser vessel;
   providing a condensing fluid and a pump fluid;
   varying the flow of the pump fluid to control a liquid level in the vessel;
   directing the condensing fluid to the condenser vessel;
   varying the flow of the condensing fluid to control the pressure in the vessel;
   contacting the vapor with the condensing fluid to create a condensate; and
   combining the condensate and the pump fluid.

10. A process for condensing vapor comprising the steps of:
    providing contact area within a condenser vessel;
    directing vapor to the condenser vessel;
    providing a condensing fluid and a pump fluid;
    varying the flow of the pump fluid to control a liquid level in the vessel;
    directing the condensing fluid to the condenser vessel;
    varying the flow of the condensing fluid to control the pressure in the vessel;
    contacting the vapor with the condensing fluid to create a condensate; and
    combining the condensate and the pump fluid;
    and further wherein a surface layer of liquid in the vessel is kept substantially at its saturation temperature at the vessel operating pressure.

11. A process for condensing vapor comprising the steps of:
    condensing vapor in a condenser vessel to create a condensate;
    mixing the condensate with a pump fluid to create a combined stream;
    measuring a temperature difference between the condensate and the combined stream;
    utilizing the temperature difference to provide control logic for a vapor compressor.

12. A vapor condenser comprising:
    a vessel;
    a liquified gas input;
    control means on the liquified gas input for varying a first liquified gas stream to control the pressure in the vessel;
    a vapor input to the vessel;

means for condensing vapor in the vessel; and means for combining condensed vapor with a second liquified gas stream.

13. A vapor condenser comprising:

a vessel;

a liquified gas input;

control means on the liquified gas input for varying a first liquified gas stream to control the pressure in the vessel;

a vapor input to the vessel;

means for condensing vapor in the vessel; and means for combining condensed vapor with a second liquified gas stream; and a diaphragm plate below the vapor condensing means.

14. The vapor condenser of claim 12, wherein the means for combining the condensed vapor with the second liquified gas stream comprises a mixing chamber in a bottom portion of the vessel.

15. The vapor condenser of claim 12, wherein the means for combining the condensed vapor with the second liquified gas stream is disposed outside the vessel.

16. A vapor condenser comprising:

a vessel;

a liquified gas input;

control means on the liquified gas input for varying a first liquified gas stream to control the pressure in the vessel, the control means comprising a pressure transmitter, a controller, and a valve;

a vapor input to the vessel;

means for condensing vapor in the vessel; and means for combining condensed vapor with a second liquified gas stream.

17. A vapor condenser comprising:

a vessel;

a liquified gas input;

control means on the liquified gas input for varying a first liquified gas stream to control the pressure in the vessel;

a vapor input to the vessel;

means for condensing vapor in the vessel; and means for combining condensed vapor with a second liquified gas stream; and wherein the vessel is adapted to receive a supply of make-up gas, and further wherein the vessel includes a make-up valve operatively connected to the control system.

18. A vapor condenser comprising:

a vessel;

a liquified gas input;

control means on the liquified gas input for varying a first liquified gas stream to control the pressure in the vessel;

a vapor input to the vessel;

means for condensing vapor in the vessel;

means for combining condensed vapor with a second liquified gas stream; and a control system adapted to control the second liquified gas stream, the control system comprising a liquid level transmitter, a controller, and a valve.

19. A vapor condenser comprising:

a vessel;

a liquified gas input;

control means on the liquified gas input for varying a first liquified gas stream to control the pressure in the vessel;

a vapor input to the vessel;

means for condensing vapor in the vessel;

a second liquified gas input;

second control means on the second liquified gas input for varying a second liquified gas stream to control liquid level in the vessel; and means for combining condensed vapor with the second liquified gas stream.

20. A vapor condenser comprising:

a vessel;

means for condensing vapor in the vessel;

control means for varying the flow of a first stream of liquified gas to control pressure in the vessel;

means for combining the condensed vapor with a second stream of liquified gas to create a combined stream;

means for measuring a temperature difference between the condensate and the combined stream; and means for using the temperature difference to control a vapor compressor.

21. A process for condensing vapor in a condenser vessel comprising the steps of:

providing a contact area within the condenser vessel;

directing vapor to the condenser vessel;

providing a condensing fluid and a pump fluid;

controlling a liquid level in the vessel;

directing the condensing fluid to the condenser vessel;

controlling the pressure in the vessel;

contacting the vapor with the condensing fluid to create a condensate; and combining the condensate and the pump fluid.

22. The process of claim 21, wherein the liquid level is controlled by varying the flow of the pump fluid, and wherein the pressure is controlled by varying the flow of the condensing fluid.

23. A vapor condenser having controlled temperature and liquid level comprising:

a vessel;

a liquified gas input, the liquified gas input arranged to provide a first liquified gas stream and a second liquified gas stream;

a vapor input;

a pressure controller arranged to control the pressure in the vessel by varying the flow of the first liquified gas stream into the vessel;

a contact area arranged to permit direct contact between the first liquified gas stream and the vapor within the vessel;

a liquid level controller arranged to control a liquid level within the vessel by varying the second liquified gas stream; and means for combining condensed vapor with the second liquified gas stream.

* * * * *